United States Patent Office 3,296,193
Patented Jan. 3, 1967

---

3,296,193
STABILIZED POLYOLEFIN COMPOSITIONS CONTAINING TIN PHOSPHINATES
Edward N. Walsh, Chicago Heights, Ill., and Adam F. Kopacki, Westwood, N.J., assignors to Stauffer Chemical Company, New York, N.Y., a corporation of Delaware
No Drawing. Original application Aug. 28, 1962, Ser. No. 220,036. Divided and this application Sept. 7, 1965, Ser No. 510,722
8 Claims. (Cl. 260—45.75)

This application is a division of copending application 220,036 filed on August 28, 1962.

This invention is directed to a novel group of tin phosphinates and the stabilization of polyolefins therewith. In particular, it is concerned with suppressing the degradation of polyolefins at elevated temperatures or by prolonged exposure to ultraviolet light by the inclusion in said polyolefin of one or more of the novel tin phosphinates disclosed herein. In one preferred aspect of the invention pertains to crystalline polypropylene compositions stabilized against degradation by having incorporated therein small amounts of the novel tin phosphinates and to the methods of preparing said compositions.

The novel compounds of the present invention may be illustrated by the following general formula $$\left[(C_6H_5)_2\overset{X}{\underset{\|}{P}}Y\right]_m SnR_{4-m}$$

wherein X and Y are selected from the group consisting of sulfur and oxygen, R is selected from the group consisting of phenyl and 1 to 12 carbon alkyl radicals, and $m$ is a positive integer from 1 to 4.

Preparation of the tin phosphinates may be accomplished in accordance with the following general equation $$m(C_6H_5)_2P(X)YNa + SnR_{4-m}Cl_m$$
$$\rightarrow [(C_6H_5)_2P(X)Y]_m SnR_{4-m} + mNaCl$$

wherein X, Y, R, and $m$ are as hereinbefore defined. Preferably the above reaction is carried out at elevated temperatures in the presence of an organic solvent such as acetone, benzene, and the like. A preferred reaction temperature range is between 50° C. and 250° C. The products of the reaction, which are normally solids (or sometimes viscous liquids), may be separated from the reaction matrix by a filtration or decantation. In order to purify the product it will usually be necessary to remove volatiles under elevated temperatures, wash with water or an organic solvent, and dry under elevated temperatures and/or in the presence of a desiccating agent.

Among the reactants employed by the process of the present invention, the sodium diphenylphosphinodithioate, sodium diphenylphosphinothioate, and sodium diphenylphosphinate are fairly unknown. However, the parent acids from which these reactants may be prepared are generally known in the art. In this regard reference is made to "Organophosphorus Compounds," Kosolapoff, G. M., John Wiley and Sons Company, Inc., London, 1950. Further, typical methods by which these reactants may be prepared are described in the examples which follow hereinafter.

The invention is further illustrated, but not limited, by the following examples:

EXAMPLE 1.—[(C$_6$H$_5$)$_2$P(S)S]$_2$Sn(C$_4$H$_9$)$_2$

The (C$_6$H$_5$)$_2$P(S)SNa intermediate was first prepared as follows: Into the reaction product of 69.0 grams of sodium in 2 liters of 2B ethanol was bubbled H$_2$S until the solution was acidic to phenolphthalein indicator. During the H$_2$S addition, the temperature was held below 35° C. Next the reaction mixture was cooled to 0° C. and 378.7 grams of (C$_6$H$_5$)$_2$P(S)Cl was added dropwise while stirring over a period of one hour. When the slightly exothermic reaction and the precipitation of NaCl ceased, the mixture was stirred further for one hour (0° C.), then warmed slowly to 45° C., held for 30 minutes, cooled, and finally, filtered. The filtrate was concentrated by stripping off solvent and the product was fractionally crystallized (from ether-ethanol solution) to furnish a 90% yield of sodium diphenylphosphinodithioate.

Thirty grams of Sn(C$_4$H$_9$)$_2$Cl$_2$ in 150 ml. of acetone was then added to 55.0 grams of the sodium diphenylphosphinodithioate intermediate prepared by the foregoing method. The reaction mixture was refluxed for 3 hours and filtered. The filter cake was washed with 500 ml. of H$_2$O and air dried to yield 58.5 grams (80% yield) of S,S-bis(diphenylphosphinodithio) dibutyl tin having a melting point range of 138–140° C. and an analysis of 8.4% P, 17.8% S, and 15.1% Sn compared to the theoretical calculated values for the product of 8.4% P, 17.5% S, and 16.3% Sn.

EXAMPLE 2.—[(C$_6$H$_5$)$_2$P(O)S]$_2$Sn(C$_4$H$_9$)$_2$

The (C$_6$H$_5$)$_2$P(O)SNa intermediate was first prepared as follows: To a solution of 250 ml. of concentrated HCl in 200 ml. H$_2$O was added dropwise 130.0 grams of (C$_6$H$_5$)$_2$P(S)Cl while stirring at reflux temperature. Thereafter the reaction mixture was stirred at reflux for 2 additional hours, cooled, and the resulting crystalline product, which analysed as (C$_6$H$_5$)$_2$P(O)SH (94% of theoretically predicted yield) having a melting point of 148–150° C., was recovered by filtration and dried. To a solution prepared by reacting 9.9 grams of Na with 300 ml. ethanol was added 100 grams of the (C$_6$H$_5$)$_2$P(O)SH produced from the foregoing reaction. The mixture was slowly warmed to reflux and an exothermic reaction was observed. After this reaction subsided the solvent was stripped from the mixture yielding 108.5 grams of sodium diphenylphosphinothioate with a melting point of 260° C.

To 25.6 grams of sodium diphenylphosphinothioate in 150 cc. of acetone was added 15.2 grams of Sn(C$_4$H$_9$)$_2$Cl$_2$. The mixture was refluxed for three hours, cooled, and poured into ice water. The oil layer was extracted with ether, washed with 100 cc. each of 4% NaOH and water, and counter washed with ether (100 cc.). After drying the washed solution over Na$_2$SO$_4$, the ether was stripped from the product at 60° C./1 mm. Hg to yield 30.0 grams (86% of calculated yield) of S,S-bis(diphenylphosphinothio) dibutyl tin having an index of refraction $N_D^{25}=1.6275$. The analysis showed 8.8% P, 9.4% S, 0.6% Cl and 16.4% Sn compared to 8.9% P, 9.2% S, 0.0% Cl and 17.0% Sn, theoretical.

EXAMPLE 3.—[(C$_6$H$_5$)$_2$P(O)O]$_2$Sn(C$_4$H$_9$)$_2$

The (C$_6$H$_5$)$_2$P(O)ONa intermediate was first prepared as follows: To a solution of 250 ml. of concentrated HCl in 200 ml. of H$_2$O was added 130.7 grams of $$(C_6H_5)_2P(O)Cl$$

while stirring at reflux. After one additional hour at reflux the solution was cooled whereupon (C$_6$H$_5$)$_2$P(O)OH crystallized out of solution and was recovered and dried. To a solution consisting of 48.5 grams of the $$(C_6H_5)_2P(O)OH$$

in 100 ml. H$_2$O was added sufficient NaOH (50% solution) to effect neutralization. The water was removed by heating the solution under vacuum to furnish an essentially qualitative yield of sodium diphenylphosphinate.

To 9.8 grams of sodium diphenylphosphinate in 75 ml. of acetone was added 6.1 grams of Sn(C$_4$H$_9$)$_2$Cl$_2$. The mixture was refluxed for three hours, poured into 500 ml. of ice water, and filtered. The filter cake was rinsed with 500 ml. of water, then with ethyl ether, and finally, dried to 60° C. at 1 mm. Hg. Analysis of the product (13.0 grams, 98% yield) showed 9.3% P, 18.9% Sn, and 0.0% Cl compared to the calculated values of 9.6% P, 17.8% Sn, and 0.0% Cl for O,O-bis(diphenylphosphino) dibutyl tin.

EXAMPLE 4.—$[(C_6H_5)_2P(S)S]_4Sn$

To 5.2 grams of $SnCl_4$ in 100 ml. acetone was added 22.0 grams of sodium diphenylphosphinodithioate (prepared in accordance with the method described in Example 1). The solution was refluxed for three hours then poured into ice water and filtered. The filter cake was dried to yield 19.4 grams (80% yield) of S,S,S,S-tetra (diphenylphosphinodithio) tin. By analysis the product contained 10.7% P, 23.1% S, and 11.0% Sn compared to the theoretical calculated values of 11.1% P, 23.2% S, and 10.7% Sn.

EXAMPLE 5.—$(C_6H_5)_2P(S)S$—$Sn(C_6H_5)_3$

Nine grams of sodium diphenylphosphinodithioate (prepared by method of Example 1) was added to 11.5 grams of $Sn(C_6H_5)_3Cl$ in 100 ml. acetone. The solution was refluxed for six hours, cooled, poured into ice water, and extracted with ether and benzene. The solution was thereafter dried over $Na_2SO_4$ and the volatiles were removed at 60° C. and 1 mm. Hg. Upon analysis the product (18.0 grams, 100% yield) was found to contain 6.0% P, 10.8% S, and 17.4% Sn compared to the calculated values of 5.2% P, 10.7% S, and 19.8% Sn for the compound S-diphenylphosphinothio-triphenyl tin. The melting point was 127–130° C.

The following specific compounds were prepared by methods substantially in accordance with one or more of those described in Examples 1 through 5, which methods employed the substituted or unsubstituted tin chlorides and sodium diphenylphosphinodithioate, sodium diphenylphosphinothioate, or sodium diphenylphosphinate that would indicate by the structure of the resulting product. Where significant and/or available, typical yields and analyses are furnished.

EXAMPLE 6.—$[(C_6H_5)_2P(S)S]_2Sn(C_6H_5)_2$

S,S-bis(diphenylphosphinodithio) diphenyl tin; M.P.= 218–220° C.; yield=96.2% of theory. *Analysis.*—Found: 8.2% P, 15.6% S, 16.9% Sn. Calculated: 8.1% P, 16.6% S, 15.4% Sn.

EXAMPLE 7.—$[(C_6H_5)_2P(S)S]_2Sn(C_8H_{17})_2$

S,S-bis(diphenylphosphinodithio) dioctyl tin; yield= 95.8% of theory. *Analysis.*—Found: 7.3% P, 14.8% S, 14.4% Sn. Calculated: 7.4% P, 15.2% S, 14.1% Sn.

EXAMPLE 8.—$[(C_6H_5)_2P(S)S]_2Sn(C_{12}H_{25})_2$

S,S-bis(diphenylphosphinodithio) dilauryl tin; yield= 96% theory. *Analysis.*—Found: 6.6% P, 14.0% S, 10.0% Sn. Calculated: 6.5% P, 13.4% S, 11.9% Sn.

EXAMPLE 9.—$[(C_6H_5)_2P(O)S]_2Sn(C_8H_{17})_2$

S,S-bis(diphenylphosphinothio) dioctyl tin; yield=73% of theory.

EXAMPLE 10.—$(C_6H_5)_2P(O)S$—$Sn(C_6H_5)_3$

S-(diphenylphosphinothio) triphenyl tin; M.P.=120–125° C. *Analysis.*—Found: 6.4% P, 5.2% S, 15.7% Sn. Calculated: 7.1% P, 5.1% S, 16.9% Sn.

EXAMPLE 11.—$[(C_6H_5)_2P(O)S]_2Sn(C_6H_5)_2$

S,S-bis(diphenylphosphinothio) diphenyl tin.

EXAMPLE 12.—$[(C_6H_5)_2P(O)S]_2Sn(C_{12}H_{25})_2$

S,S,-bis(diphenylphosphinothio) dilauryl tin; yield= 99% of theory.

EXAMPLE 13.—$[(C_6H_5)_2P(O)O]_2Sn(C_2H_{25})_2$

O,O-bis(diphenylphosphino) dilauryl tin; yield=75% of theory. *Analysis.*—Found: 7.3% P, 12.4% Sn. Calculated: 7.0% P, 13.3% Sn.

EXAMPLE 14.—$[(C_6H_5)_2P(O)O]_2Sn(C_6H_5)_2$

O,O-bis(diphenylphosphino) diphenyl tin; yield=89% of theory.

EXAMPLE 15.—$[(C_6H_5)_2P(O)S]_4Sn$

S,S,S,S-tetra(diphenylphosphinothio) tin; yield=61% of theory. *Analysis.*—Found: 11.0% P, 11.2% S, 11.2% Sn. Calculated: 11.8% P, 12.2% S, 11.3% Sn.

EXAMPLE 16.—$[(C_6H_5)_2P(S)S]_2Sn(CH_3)_2$

S,S-bis(diphenylphosphinodithio) dimethyl tin; M.P.= 177–181° C.; yield=99% of theory. *Analysis.*—Found: 9.6% P, 19.8% S, 18.3% Sn. Calculated: 9.5% P, 20.7% S, 17.1% Sn.

The foregoing specific compounds have been tested to determine their effect upon heat and weather (U.V.) degradation of polyolefins when incorporated therein in relatively minor percentages.

Although possessing excellent physical properties, the polyolefins, specifically, polyethylene, polypropylene, and polybutylene, are susceptible to deterioration at elevated temperatures, apparently as a result of oxidative degradation. Perhaps the polyolefin most severely effected by high temperatures is polypropylene. When heated in a forced draft oven to a temperature of 150° C., a one inch diameter disc about 25–30 mils thick, prepared from unstabilized polypropylene, will normally become brittle or disintegrate within a period of one or two hours. Generally, all of the known grades of polyolefins are more or less subject to air oxidation as above described, although the crystalline or stereo-regular polypropylene is especially prone to this phenomenon.

Likewise, the polyolefins (and in particular polypropylene) undergo degradation at more moderate temperatures when exposed to ultraviolet light for long periods of time. For example, polypropylene discs of the size described hereinbefore will usually become brittle within about 100–110 hours when exposed in an Atlas Weatherometer (xenon arc type with water spray) at a temperature of 140° F.

Obviously, polypropylene requires stabilization against oxidative and ultraviolet light degradation, and numerous varieties of additives have been proposed in an effort to suppress these undesirable features. Among the commercial additives suggested for this purpose are the bis (dialkylphenol) sulfides, including monosulfides and disulfides. The following table illustrates typical test data on crystalline polypropylene stabilized with 0.5% of the indicated prior art bis phenolic sulfide anti-oxidant. Each polypropylene test sample was exposed in a forced draft oven to a temperature of 150° C.

*Table I*

| Compound: | Time to embrittlement, hours |
|---|---|
| 4,4'-thiobis (6-tert-butyl-o-cresol) | 38 |
| 2,2'-thiobis (4-methyl-6-tert-butylphenol) | 16 |
| 4,4'-thiobis (6-tert-butyl-m-cresol) | 78 |

Many highly effective compounds are presently available for stabilizing polypropylene against weathering (U.V.) degradation. The following table illustrates the stabilizing effect of various typical commercial polypropylene ultraviolet light stabilizers (0.5% of the total resin) when tested in an Atlas Weatherometer at a temperature of 140° F.

*Table II*

| Compound: | Time to embrittlement, hours |
|---|---|
| 2-hydroxy 4-methoxy 2-carboxy benzophenol | 750 |
| 2 - (2' - hydroxy 5'-methyl phenyl)benzotriazole | 336.5 |
| 2-hydroxy 4-methoxy benzophenone | 468 |
| Octyl phenyl salicylate | 507 |
| 2-hydroxy 4-n-octoxy benzophenone | 2107 |

Unfortunately, commercial ultraviolet light absorbers normally have little or no activity as anti-oxidants. For example, unstabilized polypropylene containing any of the compounds shown in Table II will become brittle within about four hours by the forced draft oven test (150° C.). In most cases failure will be observed in about two hours.

The novel tin phosphinates of the present invention, and in particular the dithio compounds, have been found to inhibit degradation (oxidative and/or ultraviolet) of polyethylene, polypropylene, and polybutylene. Further, the degree of stability accomplished is generally equal to or superior to the prior art stabilizers. For oxidation or heat stability the tin phosphinates may be added in concentrations of between 0.05% and 0.5% by weight of the total polymer composition. Somewhat higher concentrations are normally required for ultraviolet light stabilization. The preferred concentration for ultraviolet light stabilization is between 0.5% and 2.0% by weight of the final polymer, and in essentially all cases not less than 0.1% nor more than 5.0% by weight of the composition. The following table summarizes the results obtained by testing crystalline polypropylene compositions containing the novel compounds of the invention, at the concentrations indicated.

*Table III*

| Compound | Time to Embrittlement, hours | |
|---|---|---|
| | Oxidation (Forced Draft Oven at 150° C.) | U.V. Absorption (Atlas Weatherometer at 140° F.) |
| S-diphenylphosphinodithio triphenyl tin (0.3%) | 17 | |
| S-diphenylphosphinodithio triphenyl tin (0.5%) | 26 | |
| S,S-bis(diphenylphosphinodithio) dilauryl tin (0.3%) | 67 | |
| S,S-bis(diphenylphosphinodithio) dilauryl tin (0.5%) | 77 | |
| S,S-bis(diphenylphosphinodithio) dioctyl tin (0.1%) | 35 | |
| S,S-bis(diphenylphosphinodithio) dioctyl tin (0.3%) | 78 | |
| S,S-bis(diphenylphosphinodithio) dioctyl tin (0.5%) | 97 | |
| S,S-bis(diphenylphosphinodithio) dibutyl tin (0.5%) | 133 | 774 |
| O,O-bis(diphenylphosphino) dibutyl tin (0.1%)+dilaurylthiodipropionate (0.2%) | 96 | |
| O,O-bis(diphenylphosphino) dibutyl tin (0.3%) | 10 | |
| Dilaurylthiodipropionate (0.3%) | 52 | |

From the data of Table III it may be observed that a mixture of O,O-bis(diphenylphosphino) dibutyl tin and dilaurylthiodipropionate is synergistic in stabilizing polypropylene to heat degradation. Such synergism has been observed with other compounds of the invention on both oxidative degradation and ultraviolet light degradation.

It has been found generally that the phosphinodithio compounds of the general formula $$[(C_6H_5)_2P(S)S]_mSnR_{4-m}$$

wherein R and m are as previously defined, are more efficient than the phosphinothio and phosphino compounds in stabilizing crystalline polypropylene, and, for this reason, the phosphinodithio compounds represent a preferred class of polypropylene stabilizers.

The following example illustrates the procedure for preparing stabilized crystalline polypropylene compositions of the invention, although the inclusion of this example is not to be taken as limiting or otherwise imposing any restrictions on the invention and it is understood that variations in practicing the same without departing from the scope or spirit thereof will be apparent to those skilled in the art to which the said invention pertains.

EXAMPLE 17

Ten grams of powdered polypropylene resin containing 0.5% of the selected candidate stabilizer was placed on the center of a 6″ x 6″ stainless steel plate. A similar steel plate was then placed on top of the powder while exerting a slight downward pressure. The assembly was placed in the center of the lower platen of a hydraulic press which was previously heated to 350° F. The lower platen of the press was raised until both platens contacted the upper and lower 6″ x 6″ steel plates. The powdered sample was allowed to warm up for about 4 minutes or until fusion of the resins occurred. As the resin began to melt, the lower platen of the press was raised slightly to insure that both platens contacted the steel plates enclosing the sample. After about 4 minutes or when the fusion of the resin occurred, the lower platen was raised to a one-ton load and so maintained for two minutes. The drain valve was then opened to vent off steam, after which cold water was admitted to cool the platen and plates to 50° F. The molded circular sheet of resin was approximately 25–30 mils thick.

One inch discs were cut from the molded sheet and placed in petri dishes and then exposed to a temperature of 150° C. in a forced draft oven. The samples were examined periodically and checked for signs of discoloration, crystallization, opacity, scorching of the edges, complete embrittlement and cracking. After removal from the oven, the samples were then compared with control samples containing no stabilizer. For determining the stability to ultraviolet light the 1″ discs were placed in an accelerated, artificial weathering apparatus (Atlas Weatherometer) containing a xenon arc and a water spray and maintaining a temperature of 140° F. The water was sprayed upon the discs for 18 minutes during every two hours of test time. The test discs were periodically examined to determine the point of gross embrittlement. The results obtained by the use of the various tin phosphinates of the invention are summarized in Table III, supra.

The mixture of powdered propylene resins and stabilizer as used in the above described procedure was prepared by intimately comingling the propylene resin and the stabilizer in a Waring Blendor until a homogenous mixture of the components was obtained. The polypropylene resin was an unstabilized, general-purpose high molecular weight polypropylene resin of the isotactic or crystalline type. A typical isotactic resin as above described has a melt index of 4 at 230° C. and a specific gravity of 0.905. An example of this type of polypropylene resin is commercially available under the trade name Profax 6501, type P–02004, and is supplied in the form of natural flakes. Other commercially available grades of unstabilized isotactic polypropylene resins have been used, and in this connection, mention is made of:

(1) Unstabilized Avisun Polypropylene (Avisun Corporation).

(2) Unstabilized Escon Polypropylene (Enjay Chemical Company).

The foregoing detailed description is given for clearness of understanding only and no unnecessary limitations should be implied therefrom.

We claim:
1. A stabilized polyolefin composition comprising a polymer obtained by polymerizing at least one unsaturated mono-olefinic hydrocarbon monomer of 2 to 4 carbon atoms and from 0.05 to 5.0 percent by weight of the total polymer composition of a compound of the formula

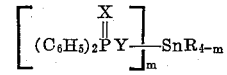

wherein X and Y are selected from the group consisting of sulfur and oxygen, R is selected from the group consisting of phenyl and 1 to 12 carbon alkyl radicals, and m is a positive integer from 1 to 4.

2. The polyolefin compositions of claim 1 wherein the compound of the formula is added in an amount of from 0.5 to 2.0 percent by weight based on the weight of the total polymer compositions.

3. A stabilized polypropylene composition comprising polypropylene having a high degree of crystallinity and as a stabilizer therefor from 0.05 to 5.0 percent by weight of the total polymer composition of a compound of the formula $$[(C_6H_5)_2P(S)S]_mSnR_{4-m}$$

wherein R is selected from the group consisting of phenyl and 1 to 12 carbon alkyl radicals and $m$ is a positive integer from 1 to 4.

4. A stabilized polypropylene composition comprising polypropylene having a high degree of crystallinity and as a stabilizer therefor from 0.05 to 5.0 percent by weight of the total polymer composition of S-diphenylphosphinodithio triphenyl tin.

5. A stabilized polypropylene composition comprising polypropylene having a high degree of crystallinity and as a stabilizer therefor from 0.05 to 5.0 percent by weight of the total polymer composition of S,S-bis(diphenylphosphinodithio) dilauryl tin.

6. A stabilized polypropylene composition comprising polypropylene having a high degree of crystallinity and as a stabilizer therefor from 0.05 to 5.0 percent by weight of the total polymer composition of S,S-bis(diphenylphosphinodithio) dioctyl tin.

7. A stabilized polypropylene composition comprising polypropylene having a high degree of crystallinity and as a stabilizer therefor from 0.05 to 5.0 percent by weight of the total polymer composition of S,S-bis(diphenylphosphinodithio) dibutyl tin.

8. A stabilized polyolefin composition comprising a polymer obtained by polymerizing at least one unsaturated mono-olefinic hydrocarbon monomer of 2 to 4 carbon atoms, from 0.05 to 5.0 percent by weight of the total polymer composition of a compound of the formula:

$$\left[(C_6H_5)_2\overset{X}{\underset{\|}{P}}Y\text{---}\right]_m SnR_{4-m}$$

wherein X and Y are selected from the group consisting of sulfur and oxygen, R is selected from the group consisting of phenyl and 1 to 12 carbon alkyl radicals, and $m$ is a positive integer from 1 to 4, and a dilaurylthiodipropionate.

References Cited by the Examiner

UNITED STATES PATENTS

| | | | |
|---|---|---|---|
| 2,735,836 | 2/1956 | Tanning | 260—45.75 |
| 2,906,731 | 9/1959 | Hill et al. | 260—45.75 |
| 3,055,925 | 9/1962 | Hartle | 260—429 |

LEON J. BERCOVITZ, *Primary Examiner.*

G. W. RAUCHFUSS, *Assistant Examiner.*